United States Patent
Chung et al.

(10) Patent No.: US 9,120,444 B2
(45) Date of Patent: Sep. 1, 2015

(54) IMPACT ABSORBING DEVICE FOR VEHICLE

(71) Applicant: Hyundai Motor Company, Seoul (KR)

(72) Inventors: Euijung Chung, Yongin-si (KR); Hee Seouk Chung, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/092,468

(22) Filed: Nov. 27, 2013

(65) Prior Publication Data

US 2014/0158449 A1    Jun. 12, 2014

(30) Foreign Application Priority Data

Dec. 10, 2012    (KR) .................. 10-2012-0143081

(51) Int. Cl.
B60R 19/20    (2006.01)

(52) U.S. Cl.
CPC ............... B60R 19/20 (2013.01); B60R 19/205 (2013.01)

(58) Field of Classification Search
CPC ............................. B60R 19/20; B60R 19/205
USPC .................................................. 180/271, 274
See application file for complete search history.

(56) References Cited

U.S. PATENT DOCUMENTS

| | | | | |
|---|---|---|---|---|
| 5,106,137 A * | 4/1992 | Curtis | ........................... | 293/107 |
| 5,646,613 A * | 7/1997 | Cho | ............................... | 340/903 |
| 5,725,265 A * | 3/1998 | Baber | ........................... | 293/107 |
| 5,959,552 A * | 9/1999 | Cho | ............................... | 340/903 |
| 6,726,261 B2 * | 4/2004 | Goto et al. | ..................... | 293/120 |
| 7,258,191 B1 * | 8/2007 | Rammer | ........................ | 180/274 |
| 7,784,817 B2 * | 8/2010 | Choi et al. | ................. | 280/728.2 |
| 7,967,098 B2 * | 6/2011 | Choi | ............................. | 180/274 |
| 8,061,743 B2 * | 11/2011 | Wakabayashi et al. | ........ | 293/102 |
| 8,123,263 B2 * | 2/2012 | Evans | ............................... | 293/132 |
| 8,152,196 B2 * | 4/2012 | Choi et al. | ................. | 280/728.2 |
| 8,350,685 B2 * | 1/2013 | Tanabe | ........................... | 340/436 |
| 8,408,632 B2 * | 4/2013 | Shimotsu et al. | ............. | 296/102 |
| 8,662,237 B2 * | 3/2014 | Chung et al. | .................. | 180/274 |
| 8,672,078 B2 * | 3/2014 | Lee et al. | ....................... | 180/271 |
| 8,764,062 B2 * | 7/2014 | Chung et al. | .................. | 280/770 |
| 2008/0093867 A1 * | 4/2008 | Glasgow et al. | ............. | 293/102 |
| 2009/0218157 A1 * | 9/2009 | Rammer | ....................... | 180/271 |

FOREIGN PATENT DOCUMENTS

| | | |
|---|---|---|
| JP | 3963055 B2 | 8/2007 |
| JP | 2010-163015 A | 7/2010 |
| KR | 2010-0128147 A | 12/2010 |
| KR | 10-2012-0119138 A | 10/2012 |

* cited by examiner

*Primary Examiner* — Paul N Dickson
*Assistant Examiner* — Timothy Wilhelm
(74) *Attorney, Agent, or Firm* — McDermott Will & Emery LLP

(57) ABSTRACT

An impact absorbing device for a vehicle according to an exemplary embodiment of the present disclosure includes a bumper back beam extending in a width direction of a vehicle, and an inflator protector mounted at a front surface of the bumper back beam to cover the front surface of the bumper back beam in a longitudinal direction of the vehicle. An airbag module disposed at the inflator protector is expanded and inflated in the width direction of the vehicle.

The impact absorbing device for a vehicle can facilitate manufacturing of a bumper back beam, simplify a structure, and effectively absorbs impact.

12 Claims, 4 Drawing Sheets

IMPACT ABSORBING DEVICE FOR VEHICLE

CROSS-REFERENCE TO RELATED APPLICATION

This application claims the benefit of priority to Korean Patent Application No. 10-2012-0143081 filed in the Korean Intellectual Property Office on Dec. 10, 2012, the entire contents of which are incorporated herein by reference.

TECHNICAL FIELD

The present disclosure relates to an impact absorbing device for a vehicle, and more particularly, relates to an impact absorbing device for a vehicle, which uses a bumper back beam and an exterior airbag.

BACKGROUND

In general, an impact absorbing device for a vehicle is mounted at a front side and a rear side of the vehicle in a longitudinal direction of the vehicle in order to absorb impact to secure safety of a passenger, reduce repulsive impact force exerted on a collision body, such as a pedestrian, an object, or other vehicles, and minimize damage or deformation of a vehicle body and mounted components thereof when the vehicle collides with the collision body.

According to the related art, the impact absorbing device for a vehicle includes bumper back beams having a beam shape disposed in a width direction of the vehicle at the front side and the rear side of the vehicle. Crash boxes are mounted at both sides of the bumper back beams in the width direction of the vehicle, respectively.

A front end portion of the crash box in the longitudinal direction of the vehicle is mounted at the bumper back beam by a stay bracket or a plate, and a rear end portion of the crash box in the longitudinal direction of the vehicle is mounted and supported at a side member by the stay bracket or the plate.

The side members are disposed at both left and right sides of the vehicle in the width direction of the vehicle and extending along the longitudinal direction of the vehicle.

For example, in case of a front collision of the vehicle of the related art at which the bumper back beam and the crash box are mounted, the bumper back beam, which extends further forward of the vehicle than the crash box, may absorb and reduce impact energy while being deformed by receiving impact energy.

Further, part of impact energy, which is not absorbed by the bumper back beam, is transmitted to the crash box connected to the bumper back beam, and thereby, the crash box also absorbs and reduces impact energy while being deformed by receiving impact energy.

Impact energy, which has not absorbed by the impact absorbing device including the bumper back beam and the crash box, is transmitted to the side member connected to the crash box, and thereby, the side member also absorbs and reduces impact energy while being deformed by receiving impact energy.

Since the side member is connected to other components of the vehicle body, the impact energy transmitted to the side member is transmitted and distributed to the other components of the vehicle body through the side member.

According to another impact absorbing device, an exterior airbag is disposed at a front side of the bumper back beam in order to reduce a collision injury to a pedestrian when the vehicle collides with the pedestrian.

The exterior airbag may form an airbag cushion for absorbing impact when the vehicle collides with the pedestrian, thereby reducing the collision injury to the pedestrian using a shock absorbing effect of the airbag cushion for absorbing impact.

The impact absorbing device for a vehicle of the related art includes an impact absorbing airbag, the bumper back beam, and the crash box. A method for efficiently installing the impact absorbing airbag at the bumper back beam and smoothly inflating the impact absorbing airbag toward the front side of the vehicle is necessary.

The above information disclosed in this Background section is only for enhancement of understanding of the background of the disclosure, and therefore, it may contain information that does not form the prior art that is already known in this country to a person of ordinary skill in the art.

SUMMARY OF THE DISCLOSURE

The present disclosure provides an impact absorbing device for a vehicle having an advantage of effectively reducing a collision injury or damage to a collision body such as a pedestrian when the vehicle collides with the collision body.

In addition, the present disclosure provides an impact absorbing device for a vehicle having an advantage of facilitating a manufacturing process of a bumper back beam, simplifying a structure, and reducing manufacturing costs.

According to an exemplary embodiment of the present disclosure, an impact absorbing device for a vehicle includes a bumper back beam extending in a width direction of a vehicle. An inflator protector is mounted at a front surface of the bumper back beam to cover the front surface of the bumper back beam in a longitudinal direction of the vehicle. An airbag module is disposed at the inflator protector and expanded in the width direction of the vehicle.

Both side portions of the bumper back beam in the width direction of the vehicle may be mounted on a side member by a crash box.

The airbag module may include an airbag cushion longitudinally inflated and extending along the width direction of the vehicle when a gas is injected into the airbag cushion. An inflator may inject the gas into the airbag cushion.

The inflator may be engaged with and mounted on the bumper back beam by one or more assembly bolts.

The bumper back beam may include an upper closed section, a lower closed section, and an intermediate flange, which integrally connects the upper closed section and the lower closed section, in a height direction of the vehicle.

The upper closed section and the lower closed section may have a quadrangular shape, respectively, may be continuously defined along the width direction of the vehicle, and may be defined to be vertically symmetric based on the intermediate flange.

The upper closed section and the lower closed section may be disposed toward a front side of the vehicle in the longitudinal direction of the vehicle.

The bumper back beam may be roll formed so as to have a shape in which one plate is bent in multiple steps.

In the bumper back beam, a height from a bottom surface of the lower closed section to an upper surface of the upper closed section is equal to or greater than 136.8 mm.

The inflator protector may extend along the width direction of the vehicle and may be bent in multiple steps in the height direction of the vehicle.

The inflator protector may include an intermediate flange which is in close contact with the intermediate flange of the bumper back beam. An upper flange extends upward from the intermediate flange in the height direction of the vehicle to cover a front side of the upper closed section of the bumper back beam, and a lower flange extends downward from the intermediate flange in the height direction of the vehicle to cover a front side of the lower closed section of the bumper back beam.

The upper flange and the lower flange may be vertically symmetric based on the intermediate flange.

The upper flange may include a lower surface disposed near the entire lower surface of the upper closed section and extending forward than the lower surface in the longitudinal direction of the vehicle. A front surface is disposed to be spaced apart forward from a front surface to cover a front side of the front surface of the upper closed section, and an upper surface extends to cover a part of an upper surface of the upper closed section. The lower flange may include an upper surface disposed near the entire upper surface of the lower closed section and extending forward than the upper surface in the longitudinal direction of the vehicle. A front surface is disposed to be spaced apart forward from a front surface to cover a front side of the front surface of the lower closed section, and a lower surface extends to cover a part of a lower surface of the lower closed section.

One or more beads may protrude on the upper surface of the upper flange and the lower surface of the lower flange in the width direction of the vehicle at a predetermined interval.

The airbag module may be disposed in a space between the upper flange and the lower flange of the inflator protector.

DETAILED DESCRIPTION

Hereinafter, an exemplary embodiment of the present disclosure will be described in detail with reference to the accompanying drawings.

Figure 1:
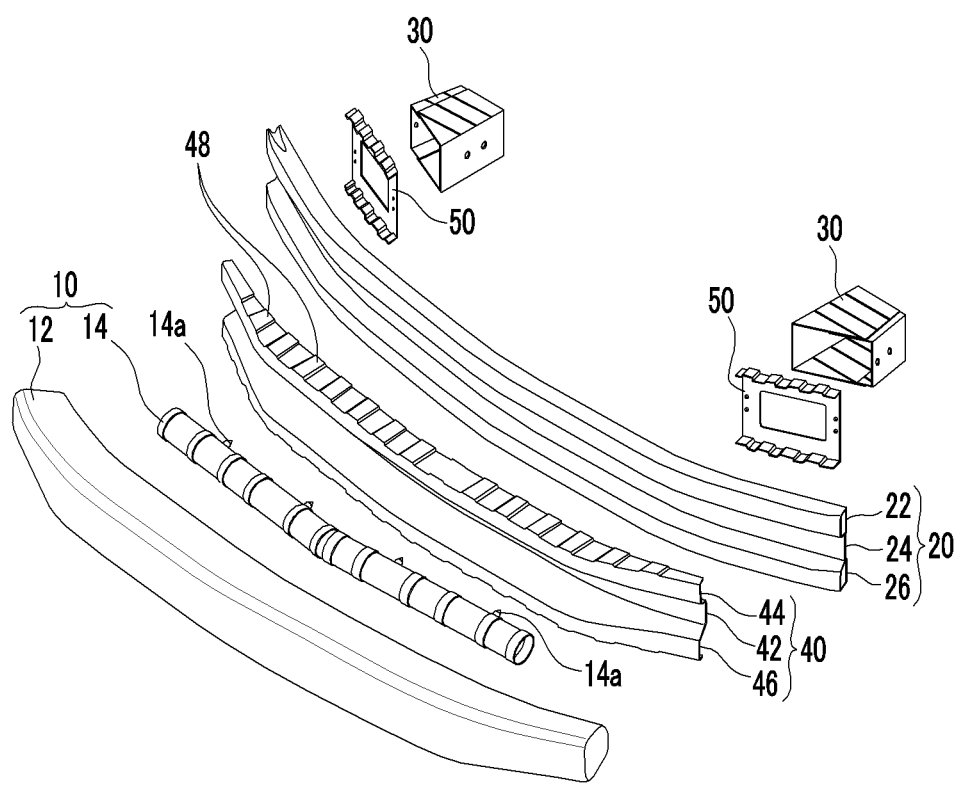
FIG. 1 is an exploded perspective view of an impact absorbing device for a vehicle according to an exemplary embodiment of the present disclosure.
Figure 2:
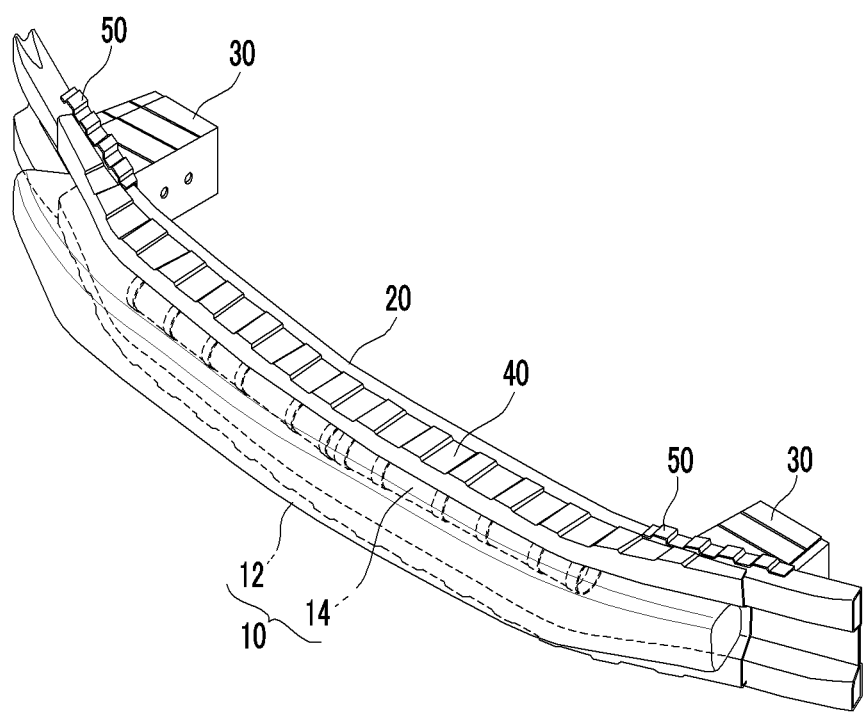
FIG. 2 is an assembled perspective view of an impact absorbing device for a vehicle according to an exemplary embodiment of the present disclosure.
Figure 3:
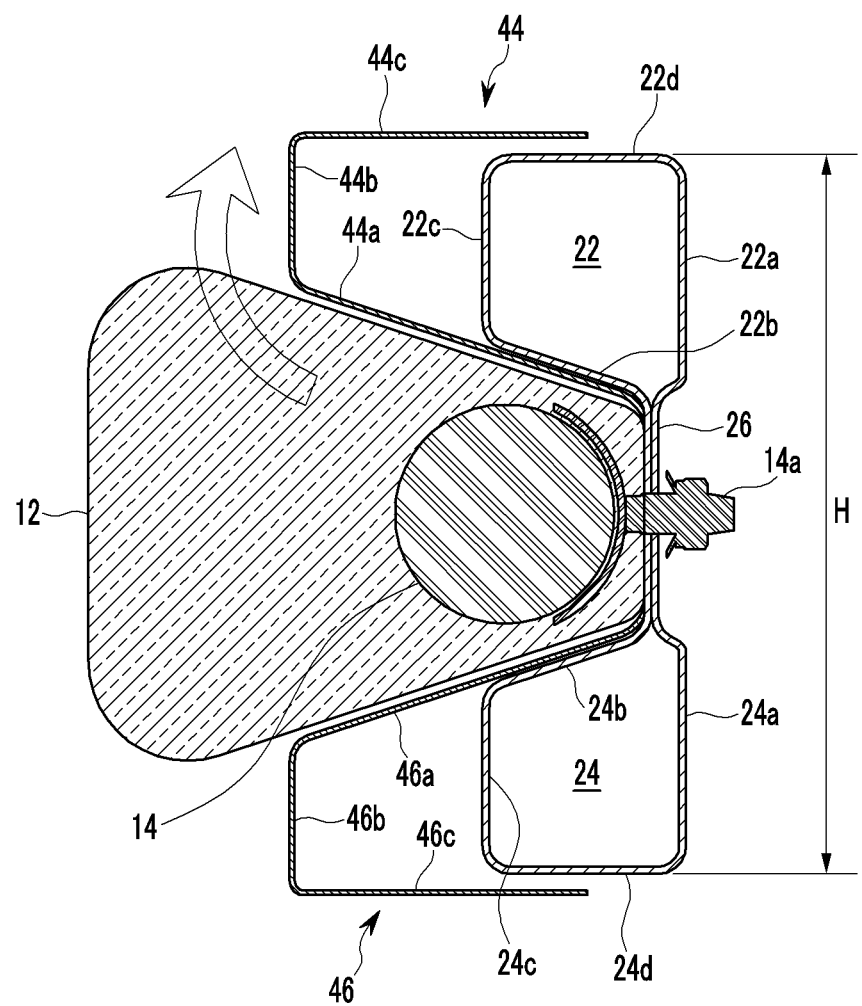
FIG. 3 is a cross-sectional view of an impact absorbing device for a vehicle according to an exemplary embodiment of the present disclosure.

FIG. 1 is an exploded perspective view of an impact absorbing device for a vehicle according to an exemplary embodiment of the present disclosure, FIG. 2 is an assembled perspective view of an impact absorbing device for a vehicle according to an exemplary embodiment of the present disclosure, and FIG. 3 is a cross-sectional view of an impact absorbing device for a vehicle according to an exemplary embodiment of the present disclosure.

As illustrated in FIGS. 1 to 3, an impact absorbing device for a vehicle according to an exemplary embodiment of the present disclosure includes an airbag module 10, a bumper back beam 20, and crash boxes 30.

The airbag module 10 includes an airbag cushion 12 which is longitudinally inflated and extends along a width direction of a vehicle when air or gas is injected into the airbag cushion 12, and an inflator 14 injects air or gas into the airbag cushion 12.

The inflator 14 may be formed in a pipe shape and extend along the width direction of the vehicle.

The inflator 14 generates gas by a trigger signal from a controller, which is not illustrated, when the controller detects a collision, and forcibly injects the generated gas into the airbag cushion 12 to expand the airbag cushion 12.

At least one assembly bolt 14a is installed at a predetermined distance apart in a longitudinal direction of the inflator 14, so that the inflator 14 may be engaged and mounted to the bumper back beam 20 by the assembly bolt 14a.

The bumper back beam 20 having a beam shape longitudinally extends in the width direction of the vehicle.

As illustrated in FIG. 3 in detail by using a cross section, the bumper back beam 20 includes an upper closed section 22, a lower closed section 24, and an intermediate flange 26 which connects the upper closed section 22 and the lower closed section 24 in a height direction of the vehicle.

The upper closed section 22 and the lower closed section 24 may have a quadrangular shape, respectively, and are continuously formed along the width direction of the vehicle.

The upper closed section 22 and the lower closed section 24 are disposed toward a front side of the vehicle in the longitudinal direction of the vehicle.

Because the bumper back beam 20 has a shape in which one plate is bent in multiple steps, by the simplification of the shape, the bumper back beam 20 may be roll formed.

A height H from a bottom surface of the lower closed section 24 of the bumper back beam 20 to an upper surface of the upper closed section 22 may be defined as an appropriate height to meet the standard requirement.

The height H may be equal to or greater than 136.8 mm. A separate bumper upper rail, which is to prevent an override when the vehicle collides with a pedestrian, is not necessary, thereby reducing the number of components, weight, and cost of the vehicle.

The intermediate flange 26 integrally connects a rear surface 22a of the upper closed section 22 and a rear surface 24a of the lower closed section 24.

The airbag module 10 is mounted and supported at the bumper back beam 20 through an inflator protector 40.

The inflator protector 40 extends along the width direction of the vehicle, and bends in multiple steps in the height direction of the vehicle.

The inflator protector 40 includes an intermediate flange 42 disposed near the intermediate flange 26 of the bumper back beam 20, and an upper flange 44 extending upward from the intermediate flange 42 in the height direction of the vehicle and covering a front side of the upper closed section 22 of the bumper back beam 20. A lower flange 46 extends downward from the intermediate flange 42 in the height direction of the vehicle and covers a front side of the lower closed section 24 of the bumper back beam 20.

The upper flange 44 and the lower flange 46 may be vertically symmetric based on the intermediate flange 44.

The upper flange 44 includes a lower surface 44a disposed near the entire lower surface 22b of the upper closed section 22 and protruding further forward than the lower surface 22b in the longitudinal direction of the vehicle. A front surface 44b is disposed while being spaced apart forward from a front surface 22c to cover a front side of the front surface 22c of the upper closed section 22, and an upper surface 44c extends to cover a part of an upper surface 22d of the upper closed section 22.

The lower flange 46 includes an upper surface 46a disposed near the entire upper surface 24b of the lower closed section 24 and protruding further forward than the upper surface 24b in the longitudinal direction of the vehicle. A front surface 46b is disposed while being spaced apart forward from a front surface 24c to cover a front side of the front surface 24c of the lower closed section 24, and a lower surface 46c extends to cover a part of a lower surface 24d of the lower closed section 24.

One or more beads 48 protrude on the upper surface 44c of the upper flange 44 and the lower surface 46c of the lower flange 46 in the width direction of the vehicle at a predetermined interval.

The one or more beads 48 increase rigidity of the inflator protector 40.

The crash boxes 30 are mounted at both left and right sides of the bumper back beam 20 in a width direction of the bumper back beam 20 through mounting plates 50.

The crash box 30 generally has a hollow quadrangular box shape.

Referring to FIG. 3, in a state in which the inflator protector 40 is mounted at the bumper back beam 20 to cover a front surface of the bumper back beam 20, the airbag module 10 is disposed in a space between the upper flange 44 and the lower flange 46 of the inflator protector 40.

In a state in which the airbag module 10 is mounted at the inflator protector 40, as described above, the inflator 14 receives a trigger signal through the controller, which is not illustrated, to generate air or gas and inject the air or gas into the airbag cushion 12. The airbag cushion 12 then absorbs and reduces impact while expanding forward from the vehicle along the lower surface 44a of the upper flange 44 and the upper surface 46a of the lower flange 46 in the space between the upper flange 44 and the lower flange 46 of the inflator protector 40.

When the airbag cushion 12 is expanded and inflated, the upper flange 44 and the lower flange 46 guide the airbag cushion 12 smoothly to expand forward from the vehicle and prevent damage occurred during the expansion process of the airbag cushion 12.

Figure 4:
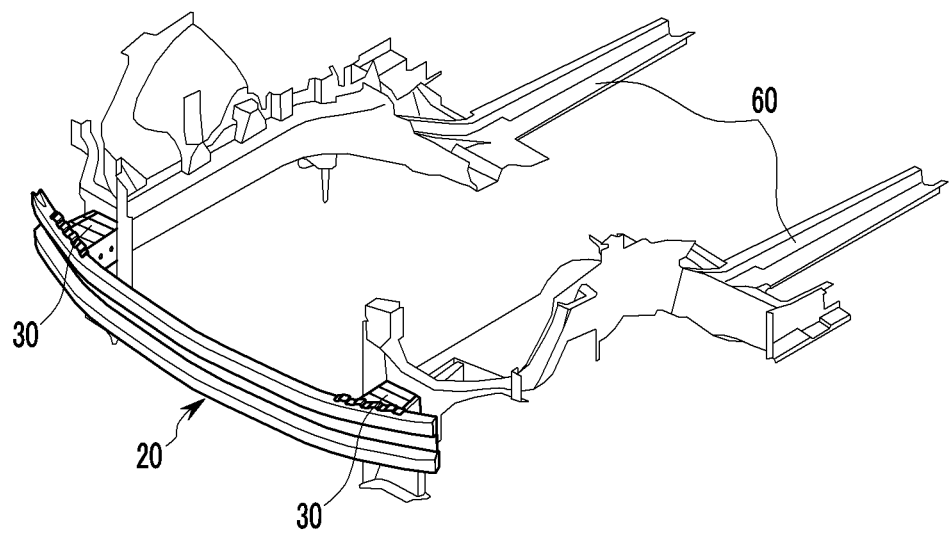
FIG. 4 is a perspective view illustrating a state in which a bumper back beam of an impact absorbing device for a vehicle according to an exemplary embodiment of the present disclosure is mounted at a side member.

FIG. 4 is a perspective view illustrating a state in which the bumper back beam of the impact absorbing device for a vehicle according to an exemplary embodiment of the present disclosure is mounted at side members.

As illustrated in FIG. 4, both portions of the bumper back beam 20 according to an exemplary embodiment of the present disclosure in the width direction of the bumper back beam 20 are mounted at the side members 60 of the vehicle body through the crash box 30.

The side members 60 are members of a front vehicle body are disposed at both side portions of the vehicle in the width direction of the vehicle and extended in the longitudinal direction of the vehicle.

According to an exemplary embodiment of the present disclosure as described above, the airbag module including the impact absorbing airbag and the inflator is disposed at the front side of the bumper back beam, which extends in the width direction of the vehicle, through the inflator protector, and as a result, an installation structure of the airbag module may be simplified and the number of components may be reduced.

As the shape of the bumper back beam is simplified, the bumper back beam may be roll formed, thereby reducing costs.

Further, it is not necessary to mount a bumper upper rail that was mounted at the bumper back beam to prevent an override of a pedestrian when the vehicle collides with the pedestrian, and as a result, the number of components, weight, and cost of the vehicle may be reduced.

Since the airbag module 10 and the inflator protector 40 may be selectively disposed at the bumper back beam 20 in accordance with options and specifications of vehicle customers in a state in which the bumper back beam 20 is mounted at the side member 60, the present disclosure may be widely applied to all types of vehicles.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An impact absorbing device for a vehicle, comprising:
a bumper back beam extending in a width direction of a vehicle;
an inflator protector mounted at a front surface of the bumper back beam to cover the front surface of the bumper back beam in a longitudinal direction of the vehicle; and
an airbag module disposed at the inflator protector and expanding in the width direction of the vehicle,
wherein the bumper back beam includes an upper closed section, a lower closed section, and an intermediate flange which integrally connects the upper closed section and the lower closed section, in a height direction of the vehicle,
wherein the inflator protector includes:
an intermediate flange thereof disposed adjacent to the intermediate flange of the bumper back beam;
an upper flange thereof extending slantly and gradually upward from the intermediate flange in the height direction of the vehicle to cover a front side of the upper closed section of the bumper back beam; and
a lower flange thereof extending slantly and gradually downward from the intermediate flange in the height direction of the vehicle to cover a front side of the lower closed section of the bumper back beam, and
wherein the upper flange includes:
a lower surface thereof adjacent to and contacting the entire lower surface of the upper closed section and protruding further forward than the lower surface of the upper closed section in the longitudinal direction of the vehicle;
a front surface thereof disposed to be spaced apart forward from a front surface of the upper closed section to cover a front side of the front surface of the upper closed section; and
an upper surface thereof extending to cover a part of an upper surface of the upper closed section, wherein the lower flange includes:
an upper surface thereof adjacent to and contacting the entire upper surface of the lower closed section and protruding further forward than the upper surface of the lower closed section in the longitudinal direction of the vehicle;
a front surface thereof disposed to be spaced apart forward from a front surface of the lower closed section to cover a front side of the front surface of the lower closed section; and
a lower surface thereof extending to cover a part of a lower surface of the lower closed section.

2. The impact absorbing device for a vehicle of claim 1, wherein both side portions of the bumper back beam in the width direction of the vehicle are mounted on a side member by a crash box.

3. The impact absorbing device for a vehicle of claim 1, wherein the airbag module includes:

an airbag cushion longitudinally inflated and extending along the width direction of the vehicle when a gas is injected into the airbag cushion; and an inflator configured to inject the gas into the airbag cushion.

4. The impact absorbing device for a vehicle of claim 3, wherein the inflator is engaged with and mounted on the bumper back beam by one or more assembly bolts.

5. The impact absorbing device for a vehicle of claim 1, wherein the upper closed section and the lower closed section have a quadrangular shape, respectively, are continuously formed along the width direction of the vehicle and formed to be vertically symmetric based on the intermediate flange.

6. The impact absorbing device for a vehicle of claim 1, wherein the upper closed section and the lower closed section are disposed toward a front side of the vehicle in the longitudinal direction of the vehicle.

7. The impact absorbing device for a vehicle of claim 1, wherein the bumper back beam is roll formed so as to have a shape in which one plate is bent in multiple steps.

8. The impact absorbing device for a vehicle of claim 1, wherein the bumper back beam is formed so that a height from a bottom surface of the lower closed section to an upper surface of the upper closed section is equal to or greater than 136.8 mm.

9. The impact absorbing device for a vehicle of claim 1, wherein the inflator protector extends along the width direction of the vehicle and is bent in multiple steps in the height direction of the vehicle.

10. The impact absorbing device for a vehicle of claim 1, wherein the upper flange and the lower flange are vertically symmetric based on the intermediate flange.

11. The impact absorbing device for a vehicle of claim 1, wherein one or more beads protrude on the upper surface of the upper flange and the lower surface of the lower flange in the width direction of the vehicle at a predetermined interval.

12. The impact absorbing device for a vehicle of claim 1, wherein the airbag module is disposed in a space between the upper flange and the lower flange of the inflator protector.

\* \* \* \* \*